US008363005B2

(12) United States Patent
Hsieh et al.

(10) Patent No.: US 8,363,005 B2
(45) Date of Patent: Jan. 29, 2013

(54) LIQUID CRYSTAL PANEL WITH LIGHT SENSOR AND LIQUID CRYSTAL DISPLAY DEVICE USING THE SAME

(75) Inventors: Yu-Lin Hsieh, Miao-Li (TW); Shuo-Ting Yan, Miao-Li (TW); Kuan-Yi Yang, Miao-Li (TW); Tsau-Hua Hsieh, Miao-Li (TW)

(73) Assignee: Chimei Innolux Corporation, Miaoli County (TW)

( * ) Notice: Subject to any disclaimer, the term of this patent is extended or adjusted under 35 U.S.C. 154(b) by 874 days.

(21) Appl. No.: 12/384,390

(22) Filed: Apr. 3, 2009

(65) Prior Publication Data

US 2009/0251402 A1 Oct. 8, 2009

(30) Foreign Application Priority Data

Apr. 3, 2008 (TW) .............................. 97112277 A

(51) Int. Cl.
*G06F 3/36* (2006.01)
(52) U.S. Cl. ........................... 345/102; 345/87; 345/104
(58) Field of Classification Search .................. 345/87, 345/102, 104, 173–181, 207; 349/38, 56, 349/106, 110, 113, 114, 116, 160, 192; 250/200, 250/205, 216; 257/E31.102, 434, 80, 83, 257/462
See application file for complete search history.

(56) References Cited

U.S. PATENT DOCUMENTS

| | | | |
|---|---|---|---|
| 5,204,661 A * | 4/1993 | Hack et al. ...................... 345/88 |
| 6,456,347 B1 * | 9/2002 | Motomura et al. ........... 349/117 |
| 6,489,631 B2 | 12/2002 | Young et al. |
| 6,552,712 B1 * | 4/2003 | Koizumi ....................... 345/104 |
| 6,727,966 B2 * | 4/2004 | Tanaka .......................... 349/114 |
| 7,804,481 B2 * | 9/2010 | Yoon et al. .................... 345/102 |
| 7,929,191 B2 * | 4/2011 | Sakaguchi et al. .............. 359/35 |
| 2003/0146888 A1 * | 8/2003 | Yamazaki et al. .............. 345/82 |
| 2004/0252867 A1 * | 12/2004 | Lan et al. ...................... 382/124 |
| 2006/0290830 A1 * | 12/2006 | Teramoto et al. ............... 349/56 |
| 2007/0013823 A1 | 1/2007 | Jung et al. |
| 2007/0146847 A1 * | 6/2007 | sakaguchi et al. .............. 359/29 |
| 2007/0268241 A1 * | 11/2007 | Nitta et al. ..................... 345/102 |
| 2008/0002073 A1 * | 1/2008 | Hwan Moon et al. .......... 349/38 |
| 2008/0122804 A1 * | 5/2008 | Kinoshita et al. ............. 345/175 |
| 2008/0259051 A1 * | 10/2008 | Ota .............................. 345/175 |

FOREIGN PATENT DOCUMENTS

CN 1897309 A 1/2007

* cited by examiner

*Primary Examiner* — Prabodh M Dharia
(74) *Attorney, Agent, or Firm* — WPAT PC; Justin King

(57) ABSTRACT

An exemplary liquid crystal panel includes a first substrate, a second substrate opposite to the first substrate, a light sensor disposed at an inner side of the first substrate, and a black matrix disposed at an inner side of the second substrate. The light sensor includes a light-sensing unit, and the black matrix includes a semi-transparent film corresponding to the light-sensing unit. A liquid crystal display device employing the liquid crystal panel is also provided.

10 Claims, 3 Drawing Sheets ated LCD device using the same.

BACKGROUND

1. Technical Field

The present disclosure relates to liquid crystal panels; and more particularly to a liquid crystal panel with a light sensor for detecting ambient light, and a liquid crystal display (LCD) device using the same.

2. Description of Related Art

Because LCD devices have the advantages of portability, low power consumption, and low radiation, they are widely used in various portable information products such as notebooks, personal digital assistants (PDAs), video cameras, and others. Furthermore, LCD devices are often considered to have the potential to completely replace CRT (cathode ray tube) monitors and televisions.

Brightness is an important parameter in evaluating the performance of a display of an LCD device, and is often adjustable to take account of environmental conditions.

Referring to FIG. 9, a typical LCD device 1 includes a liquid crystal panel 11, and a backlight module 12 disposed under the liquid crystal panel 11 for illuminating the liquid crystal panel 11.

Also referring to FIG. 10, the backlight module 12 includes a light source 121, a brightness detector 122, and a control circuit 123. The brightness detector 122 detects a brightness of ambient light of the LCD device 1, generates a corresponding photocurrent, and transmits the photocurrent to the control circuit 123. The control circuit 123 stores a plurality of reference values having a function with photocurrent values. The control circuit 123 calculates a result according to the function of the reference values and the received photocurrent, generates a corresponding voltage signal, and adjusts the brightness of the light source 121 according to the voltage signal. Thereby, brightness of light emitted from the light source 121 is compatible with the brightness of the ambient light.

While the LCD device 1 automatically adjusts the brightness according to the brightness of the ambient light as detailed, the backlight module 12 also includes other components such as a plastic frame, a metal bottom plate, and various optical films. These and other elements complicate the structure and increase the bulk of backlight module 12, and, correspondingly, the LCD device 1.

What is needed, therefore, is a LCD panel to overcome the described limitations, and a display device employing such an LCD panel.

DETAILED DESCRIPTION

Reference will now be made to the drawings to describe various embodiments of the present invention in detail.

Figure 1:
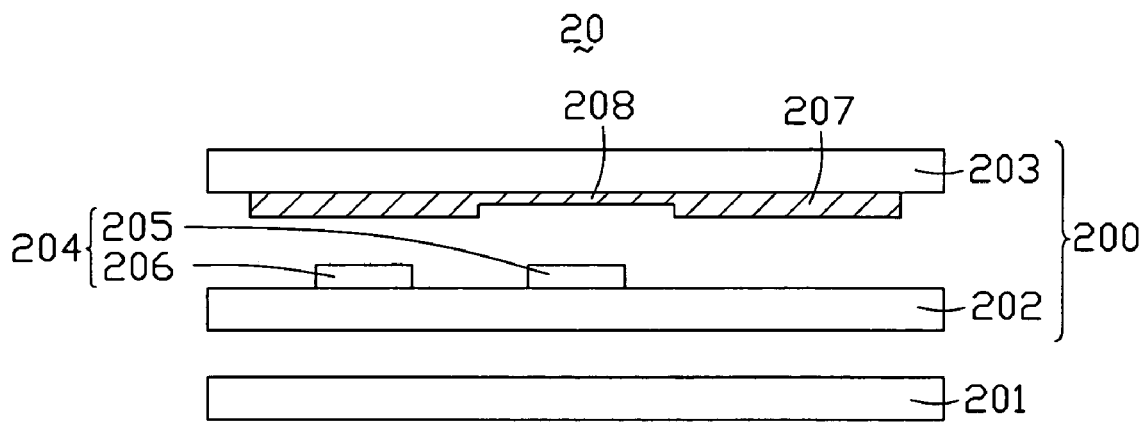
FIG. 1 is an exploded, cross-section of part of, an LCD device according to an exemplary embodiment of the present disclosure, the LCD device including a backlight module and a liquid crystal panel, the liquid crystal panel having a light sensor and a black matrix.

Referring to FIG. 1, a cross-section of part of an LCD device according to an exemplary embodiment of the present disclosure is shown. The LCD device 20 includes a liquid crystal panel 200 and a backlight module 201 supplying light to the liquid crystal panel 200. The liquid crystal panel 200 includes a first substrate 202, a second substrate 203 generally opposite and parallel to the first substrate 202, a light sensor 204, and a black matrix 207. The backlight module 201 is disposed opposite to the liquid crystal panel 200, adjacent to the first substrate 202.

The black matrix 207 is disposed on an inner surface of the second substrate 203, generally adjacent to the first substrate 202, and includes a main body (not labeled) and a semi-transparent film 208. The main body may be a resin film having a thickness of 1000 nm-1100 nm or a chromium film having a thickness of about 100 nm. The semi-transparent film 208 is the same material as the main body, and may be a resin film having a thickness of 250 nm-733 nm or a chromium film having a thickness of 25 nm-67 nm, namely, the thickness of the semi-transparent film 208 is about ¼ to ⅔ that of the main body.

The light sensor 204 is disposed at a side of the first substrate 202 adjacent to the second substrate 203. The light sensor 204 includes a light-sensing unit 205 corresponding to the semi-transparent film 208, and an auxiliary circuit 206 corresponding to the main body of the black matrix 207.

Figure 2:
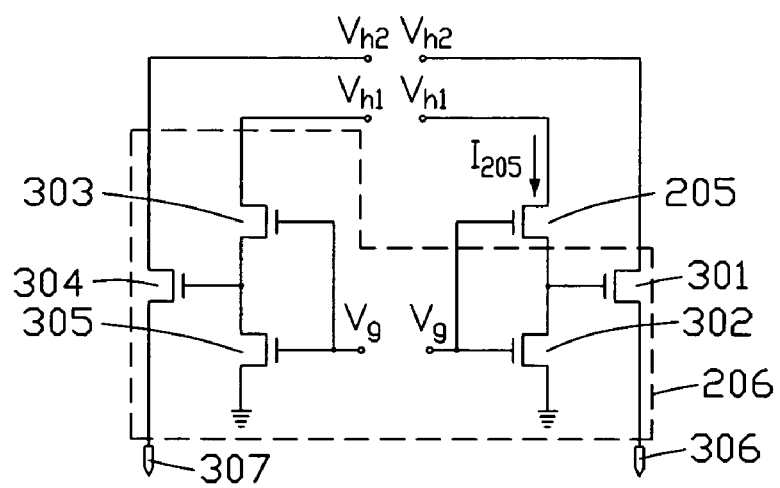
FIG. 2 is a circuit diagram of the light sensor of FIG. 1.

Referring to FIG. 2, the light-sensing unit 205 is a thin film transistor (TFT). The auxiliary circuit 206 includes a first TFT 301, a second TFT 302, a third TFT 303, a fourth TFT 304, and a fifth TFT 305. A first voltage Vh1 is applied to sources of the light-sensing unit 205 and the third TFT 303, a second voltage Vh2 is applied to sources of the first TFT 301 and the fourth TFT 304, and a gate voltage Vg is applied to gates of the light-sensing unit 205, the second TFT 302, the third TFT 303, and the fifth TFT 305. The first voltage Vh1 and the second voltage Vh2 may be +5V, and the gate voltage Vg may be −3V. A drain of the light-sensing unit 205 is connected to a gate of the first TFT 301 and a source of the second TFT 302. A drain of the first TFT 301 is connected to a first output terminal 306 of the light sensor 204. A drain of the second TFT 302 is grounded. A drain of the third TFT 303 is connected to a gate of the fourth TFT 304 and a source of the fifth TFT 305. A drain of the fourth TFT 304 is connected to a second output terminal 307 of the light sensor 204. A drain of the fifth TFT 305 is grounded.

Figure 3:
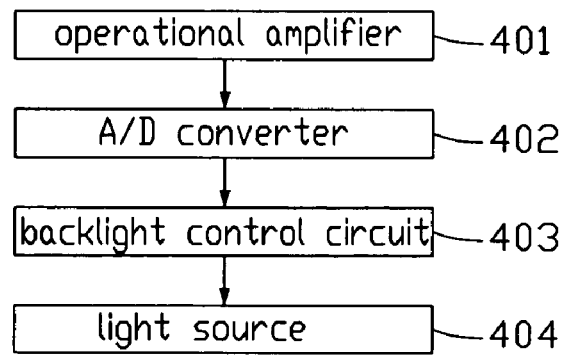
FIG. 3 is a block diagram of the backlight module of FIG. 1.

Referring to FIG. 3, the backlight module 201 includes an operational amplifier 401, an analog/digital (A/D) converter 402, a backlight control circuit 403, and a light source 404. An in-phase input (not shown) terminal and a reverse-phase input terminal (not shown) of the operational amplifier 401 are connected to the first output terminal 306 and the second output terminal 307 of the light sensor 204, respectively. The A/D converter 402, the backlight control circuit 403, and the light source 404 are connected to an output terminal (not labeled) of the operational amplifier 401 in that order.

During operation of the LCD device 20, the first voltage Vh1, the second voltage Vh2, and the gate voltage Vg are applied to the light sensor 204, thus the second output terminal 307 outputs a voltage as a reference signal and the reference signal is output to the reverse-phase input terminal of the operational amplifier 401. When ambient light passing through the semi-transparent film 208 is detected by the light-sensing unit 205, internal resistance of the light-sensing unit 205 decreases, increasing drain current I205 and a voltage between the source and the drain of the second TFT 302, such that a gate voltage of the first TFT 301 increases and a voltage between the source and the drain of the first TFT 301 decreases. An output voltage of the first output terminal 306 is a voltage drop between the second voltage Vh2 and the voltage between the source and the drain of the first TFT 301, such that the output voltage of the first output terminal 306 increases. The output voltage of the first output terminal 306 as a light-sensing signal is output to the in-phase input (not shown) terminal of the operational amplifier 401. The light-sensing signal corresponds with a brightness of the ambient light.

The operational amplifier 401 compares the light-sensing signal with the reference signal and outputs an analog signal to the A/D converter 402. The A/D converter 402 converts the analog signal into a digital signal, and outputs the digital signal to the backlight control circuit 403. The digital signal has a relationship with a backlight control current of the backlight control circuit 403. The backlight control circuit 403 generates the backlight control current according to the digital signal to control a brightness of the light source 404. Thus the light source 404 emits light corresponding to the ambient light.

Because the light sensor 204 is formed on the first substrate 202 in a same process with a TFT array of the liquid crystal panel 200, the overall process of fabricating the LCD device 20 is simplified, and costs lowered. Furthermore, the semi-transparent film 208 can scatter and reduce the light from the backlight module 201 through the second substrate 203.

Figure 4:
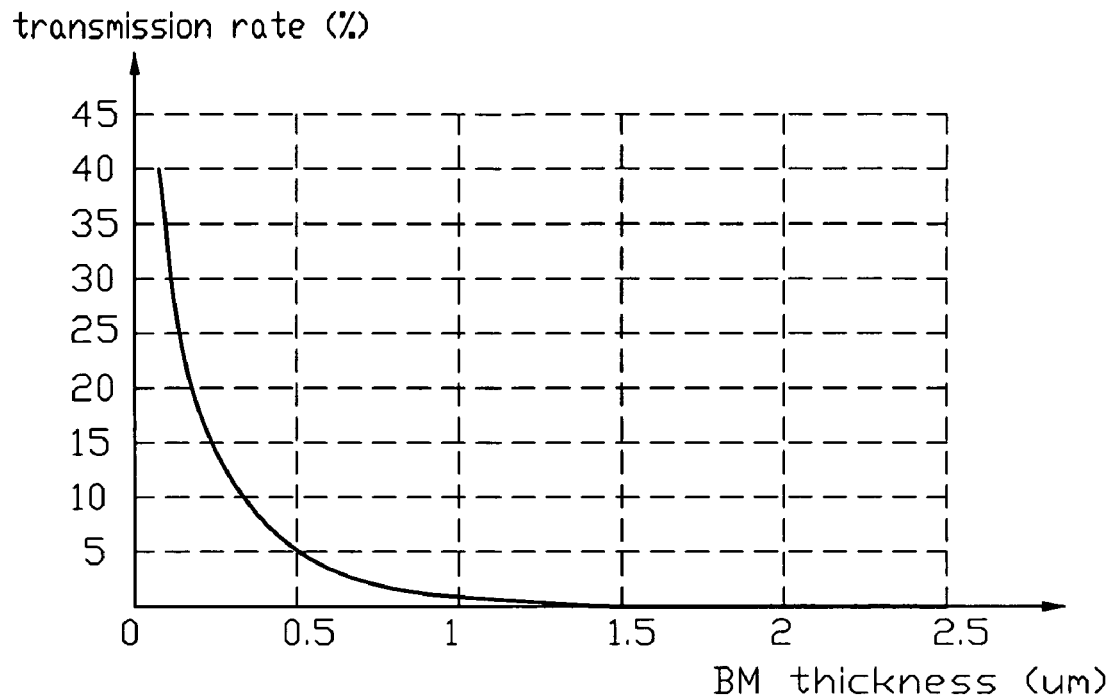
FIG. 4 is a graph of a relationship between thickness and transmission rate in a resin film employed by the black matrix of FIG. 1.

In an example of a resin film employed by a black matrix 207, in FIG. 4, a graph of a relationship between a thickness and a transmission rate of the resin film is shown. The transmission rate of the resin film improves with decreasing thickness thereof. When the thickness of the resin film exceeds 1 µm, the transmission rate thereof is close to 0. The main body of the black matrix 207 has a thickness of 1000 nm-1100 nm. The main body can thus prevent ambient light from reaching and potentially damaging the auxiliary circuit 206 of the light sensor 204, and also absorb light from the backlight module 201. When the thickness of the resin film falls below 0.7 µm, the transmission rate thereof is around 3%-40%. The semi-transparent film 208 has a thickness of 250 nm-733 nm, through which the ambient light can enter and be incident on the light-sensing unit 205 of the light sensor 204, while the light emitted from the backlight module 201 can be scattered and attenuated by the semi-transparent film 208. Therefore, the semi-transparent film 208 minimizes unwanted light-leakage of the LCD device 20 without significantly impacting the light-detection capability of the light sensor 204.

A method for manufacturing the semi-transparent film 208 of the black matrix 207 includes the following steps.

Figure 5:
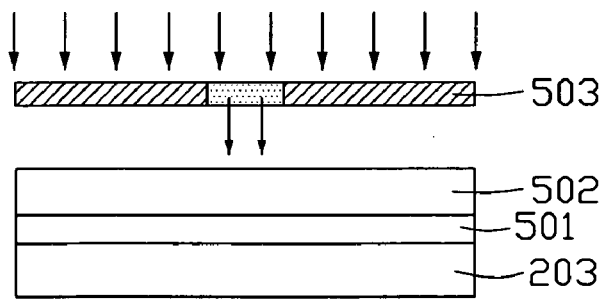
FIG. 5 is a cross-section of Step 1 of a method for manufacturing the black matrix of FIG. 1.

Referring to FIG. 5, Step 1 includes: firstly providing the second substrate 203, and depositing a resin layer 501 and a photo-resist layer 502 on the second substrate 203, wherein the resin layer 501 is made from a scattering material; and secondly, providing a photo mask 503, and exposing the photo-resist layer 502 by using the photo mask 503 via a semi-transparent method or an interference effecting method.

Figure 6:
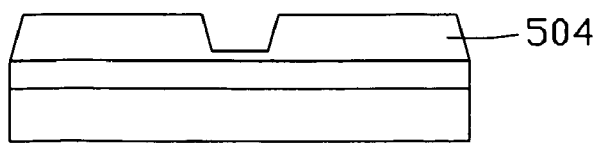
FIG. 6 is a cross-section of Step 2 of the method for manufacturing the black matrix of FIG. 1.

Referring to FIG. 6, Step 2 includes developing the photo-resist layer 502 to form a first photo-resist layer pattern 504.

Figure 7:
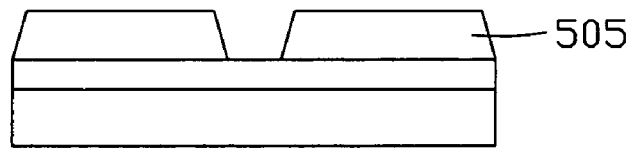
FIG. 7 is a cross-section of Step 3 of the method for manufacturing the black matrix of FIG. 1.

Referring to FIG. 7, step 3 includes etching the first photo-resist layer pattern 504 with ozone to form a second photo-resist layer pattern 505.

Figure 8:
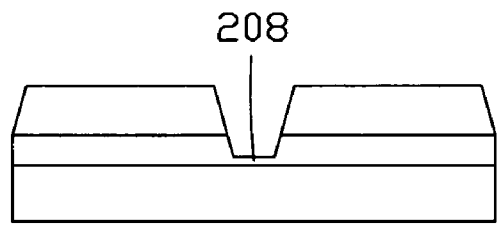
FIG. 8 is a cross-section of Step 4 of the method for manufacturing the black matrix of FIG. 1.
Figure 9:
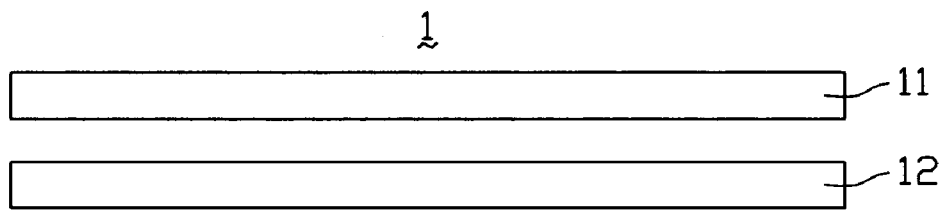
FIG. 9 is an exploded, cross-section of a conventional LCD device, the LCD device including a backlight module.
Figure 10:
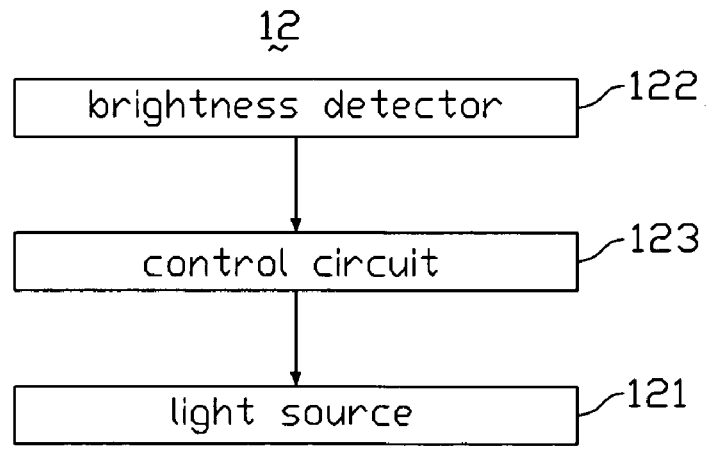
FIG. 10 is a block diagram of the backlight module of FIG. 9.

Referring to FIG. 8, step 4 includes etching the resin layer 501 (e.g., by dry etching) to form the semi-transparent film 208.

Step 5 includes removing the second photo-resist layer pattern 505 to form the main body of the black matrix 207.

It is to be understood, however, that even though numerous characteristics and advantages of preferred and exemplary embodiments have been set out in the foregoing description, together with details of the structures and functions of the embodiments, the disclosure is illustrative only; and that changes may be made in detail, especially in matters of shape, size, and arrangement of parts within the principles of the present invention to the full extent indicated by the broad general meaning of the terms in which the appended claims are expressed.

What is claimed is:

1. A liquid crystal display device, comprising:
a liquid crystal panel; and
a backlight module;
wherein the liquid crystal panel comprises a first substrate, a second substrate generally opposite to the first substrate, a light sensor comprising a light-sensing unit disposed at an inner side of the first substrate, and a black matrix comprising a semi-transparent film corresponding to the light-sensing unit disposed at an inner side of the second substrate, the backlight module disposed opposite to the liquid crystal panel adjacent to the first substrate;
wherein the light sensor comprises an auxiliary circuit corresponding to the main body of the black matrix, a first output terminal, and a second output terminal;
wherein the black matrix further comprises a main body configured for preventing ambient light from reaching the auxiliary circuit and shielding the light emitted from the backlight module;
wherein the semi-transparent film is configured for permitting the ambient light to reach the light sensing unit and scattering reducing light emitted from the backlight module through the second substrate; and
wherein the main body and the semi-transparent film are made of the same material, and a thickness of the semi-transparent film is ¼ to ⅔ of that of the main body.

2. The liquid crystal display device of claim 1 wherein the backlight module comprises an operational amplifier, an analog/digital (A/D) converter, a backlight control circuit, and a light source, the A/D converter, the backlight control circuit, and the light source connected to an output terminal of the operational amplifier in that order.

3. The liquid crystal display device of claim 2, wherein the operational amplifier further comprises an in-phase input terminal and a reverse-phase input terminal, the in-phase input terminal and the reverse-phase input terminal connected to the first output terminal and the second output terminal of the light sensor respectively.

4. The liquid crystal panel of claim 1, wherein the black matrix further comprises a main body which is a resin film having a thickness of 1000 nm-1100 nm.

5. The liquid crystal panel of claim 4, wherein the semi-transparent film is a resin film having a thickness of 250 nm-733 nm.

6. The liquid crystal panel of claim 4, wherein the main body is a chromium film having a thickness of 100 nm.

7. The liquid crystal panel of claim 6, wherein the semi-transparent film is a chromium film having a thickness of 25 nm-67 nm.

8. The liquid crystal panel of claim 1, wherein the light-sensing unit is a thin film transistor (TFT).

9. The liquid crystal panel of claim 8, wherein the light sensor further comprises an auxiliary circuit corresponding to the main body of the black matrix, a first output terminal and a second output terminal, wherein the auxiliary circuit comprises a first TFT, a second TFT, a third TFT, a fourth TFT, and a fifth TFT, a first voltage is applied to sources of the light-sensing unit and the third TFT, a second voltage applied to sources of the first TFT and the fourth TFT, a gate voltage is applied to gates of the light-sensing unit, the second TFT, the third TFT, and the fifth TFT, a drain of the light-sensing unit is connected to the first output terminal via a gate and a drain of the first TFT and grounded via a source and a drain of the second TFT, and a drain of the third TFT connected to the second output terminal via a gate and a drain of the fourth TFT and grounded via a source and a drain of the fifth TFT.

10. The liquid crystal panel of claim 8 wherein the first voltage and the second voltage are approximately +5V, and the gate voltage is approximately −3V.

* * * * *